United States Patent
De Mattia

(10) Patent No.: US 9,840,063 B2
(45) Date of Patent: Dec. 12, 2017

(54) METHOD FOR PRODUCING A PROFILE THAT HAS A RE-ENTRANT ANGLE IN A COMPOSITE MATERIAL FROM A STACK OF LAYERS OF FIBRES

(71) Applicant: AIRBUS OPERATIONS SAS, Toulouse (FR)

(72) Inventor: Denis De Mattia, Basse Goulaine (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 287 days.

(21) Appl. No.: 14/013,872

(22) Filed: Aug. 29, 2013

(65) Prior Publication Data

US 2014/0072775 A1 Mar. 13, 2014

(30) Foreign Application Priority Data

Sep. 7, 2012 (FR) ...................................... 12 58369

(51) Int. Cl.
*B29C 70/44* (2006.01)
*B32B 5/26* (2006.01)
(Continued)

(52) U.S. Cl.
CPC ................ *B32B 5/26* (2013.01); *B29C 70/34* (2013.01); *B29D 99/0003* (2013.01);
(Continued)

(58) Field of Classification Search
CPC ............ B29C 70/44; B29C 2043/3644; B29C 2043/3655
See application file for complete search history.

(56) References Cited

U.S. PATENT DOCUMENTS 4,683,099 A * 7/1987 Buxton .................... B29C 43/10
249/134
5,104,718 A * 4/1992 Asada .................. B29C 37/0064
156/196
(Continued)

FOREIGN PATENT DOCUMENTS

FR 2 928 295 9/2009

OTHER PUBLICATIONS

Hubert, P., and A. Poursartip, A method for the direct measurement of the fibre bed compaction curve of composite prepregs, Composites: Part A, vol. 32 (2001), pp. 179-187.*
(Continued)

*Primary Examiner* — Matthew Daniels
(74) *Attorney, Agent, or Firm* — Dickinson Wright

(57) ABSTRACT

A method for producing, in a composite material, a component that has a re-entrant angle, includes stacking layers of fibers which have been pre-impregnated with a resin so as to obtain a preform and placing the preform in a tooling fixture in order to subject it to a polymerization cycle including a temperature cycle, with a temperature-increase phase and at least one soak at which the temperature is maintained, and a pressure cycle on the outside of the tooling fixture with a pressure-increase phase and a pressure-hold phase, with the layers of pre-impregnated fibers being able to slip against one another when the temperature of the temperature cycle is equal to or higher than a threshold temperature Tf dependent on the resin. The temperature-increase phase includes a soak at a temperature higher than or equal to Tf, the soak beginning before the end of the pressure-increase phase.

9 Claims, 3 Drawing Sheets

(51) Int. Cl.
*B32B 37/14* (2006.01)
*B29C 70/34* (2006.01)
*B29D 99/00* (2010.01)
B29C 35/02 (2006.01)
B29K 105/08 (2006.01)

(52) U.S. Cl.
CPC .......... *B32B 37/14* (2013.01); *B29C 35/0288* (2013.01); *B29K 2105/0872* (2013.01); *Y02T 50/433* (2013.01); *Y10T 156/10* (2015.01); *Y10T 428/24636* (2015.01)

(56) References Cited

U.S. PATENT DOCUMENTS

| | | | | |
|---|---|---|---|---|
| 5,123,985 | A * | 6/1992 | Evans | B29D 7/01 156/212 |
| 5,145,621 | A * | 9/1992 | Pratt | B29C 33/30 156/245 |
| 5,348,602 | A * | 9/1994 | Makarenko | B29C 70/44 156/160 |
| 5,597,435 | A * | 1/1997 | Desautels | B29C 33/30 156/245 |
| 7,622,066 | B2 * | 11/2009 | Brustad | B29C 70/44 264/257 |
| 2006/0068170 | A1 * | 3/2006 | Hanson | B29C 70/44 428/174 |
| 2008/0060755 | A1 * | 3/2008 | Blanton | B29C 70/465 156/307.1 |
| 2009/0123708 | A1 * | 5/2009 | Depase | B29C 70/342 428/178 |
| 2009/0263618 | A1 * | 10/2009 | McCarville | B29C 70/30 428/113 |
| 2010/0126658 | A1 * | 5/2010 | De Vita | B29C 70/542 156/243 |
| 2010/0225016 | A1 * | 9/2010 | Prebil | B29C 33/306 264/39 |
| 2010/0316837 | A1 * | 12/2010 | Packer | B29C 53/063 428/105 |
| 2011/0104432 | A1 * | 5/2011 | Duqueine | B29C 33/405 428/113 |
| 2011/0259508 | A1 * | 10/2011 | Inserra Imparato | B29C 33/505 156/182 |
| 2013/0189482 | A1 * | 7/2013 | Dequine | B29C 43/52 428/130 |
| 2013/0234352 | A1 * | 9/2013 | De Mattia | B29C 70/342 264/40.5 |

OTHER PUBLICATIONS

Haskell III, William E., High Strength Glass Second Source Qualification to Composite Armor Specification MIL-L-46197(MR), U.S. Army Materials Technology Laboratory, Apr. 1992. pp. 1-8.*
Preliminary European Search Report dated May 28, 2013.

* cited by examiner

METHOD FOR PRODUCING A PROFILE THAT HAS A RE-ENTRANT ANGLE IN A COMPOSITE MATERIAL FROM A STACK OF LAYERS OF FIBRES

CROSS REFERENCE TO RELATED APPLICATIONS

This application is entitled to and claims the benefit of French Application No. 12 58369 filed Sep. 7, 2012, the disclosure of which, including the specification, claims, drawings and abstract, is incorporated herein by reference in its entirety.

FIELD

The present invention relates to a method for producing a profile that has a re-entrant angle in a composite material from a stack of layers of fibres. The invention relates more particularly to a method for producing an aircraft fuselage frame.

BACKGROUND

According to one embodiment illustrated in FIG. 1, a fuselage frame 10 takes the form of a Z-section profile, of which the central portion referred to as the web 12 forms a complete or partial annulus. The profile comprises a first flange 14 known as the inner flange, positioned at the inner edge of the web 12 and perpendicular thereto, and a second flange 16 known as the outer flange positioned at the outer edge of the web 12 and also perpendicular thereto.

One method for producing such a frame in composite material is described in document FR-2.928.295.

According to that document, first of all a substantially rectangular strip is produced from a stack of three plies of pre-impregnated fibres, each ply having fibres oriented in one direction, the strip comprising plies with different fibre orientations, one ply 18 with fibres at 30°, one ply 20 with fibres at 90° and another ply 22 with fibres at 150°.

In a second stage, the strip of fibre plies is placed on a mandrel 24 made of deformable material and is then compressed on this mandrel so that it conforms to the shape thereof.

The deformable mandrel can be deformed between a rectilinear position and a curved position but has a cross section that is incompressible or near-incompressible.

Next, the deformed strip laid on the mandrel made of deformable material is brought into contact with a heated tooling fixture which at its periphery has radial sections with a profile that complements the cross sections of the mandrel. Thus, during bending, the strip is compressed and experiences an increase in temperature.

After this first strip has been placed, a second strip of thee plies of pre-impregnated fibres is cut out and placed on another deformable mandrel then compressed thereon.

Next, this second strip deformed on its mandrel made of deformable material is brought into contact with the first strip still in position on the tooling fixture and then compressed against the first strip.

To obtain a frame, it is necessary for several strips to be attached to one another as above, before the whole assembly thus formed is polymerized. To supplement this, plies with fibres oriented at 0° may be laid by hand in-between certain strips.

In the remainder of the description, a preform means a volume of pre-impregnated or not pre-impregnated fibres, derived notably from the stack of plies, layers, strips of fibres, which has not yet been polymerized.

This method of producing an aircraft frame may prove problematic during the stacking of the strips on one another.

It is problematic because the preform has a re-entrant angle, that surface of the preform that is not in contact with the tooling fixture having a concave shape. The same problem also arises when stacking plies in order to obtain, in composite, a rectilinear profile that has a re-entrant angle.

What happens is that when a layer is applied to a stack of layers, in order for the surfaces to be in contact over the entire width of the profile, the first point of contact needs to be situated at the vertex of the re-entrant angle, with a first side of the layer to be added to the stack being applied, by unrolling it, to the corresponding side of the stack that has been formed, with the same approach then being repeated on the second side.

Given the « tack » of the layers of pre-impregnated fibres, as soon as the layers come into contact with one another it is very difficult to separate them in order to readjust their positions. As a result, obtaining a preform with layers that are in contact across the entire width of the preform is a very tricky business. This difficulty is further compounded when the layers are not rectilinear but curved, as they are in the case of an aircraft frame.

Given these placement difficulties, a defect referred to as bridging may occur at the re-entrant angle, the two layers 26, 26' not being pressed firmly against one another but delimiting a space 28 across the re-entrant angle, as illustrated in FIG. 5A.

When all the layers have been stacked, a preform 30 of pre-impregnated fibres is obtained which needs to undergo a polymerization cycle in order to obtain a composite component. As illustrated in FIG. 3, during this cycle, the preform 30 is positioned in a tooling fixture comprising a mould 32 on which the preform is positioned, and a covering 34 which covers the preform.

According to one embodiment, the mould 32 comprises means for extracting the gases, which means open via at least one port 36 onto a placement surface 38 on which the preform is placed, outside of the zone covered by the preform, but a short distance away from the said zone.

The covering 34 comprises:
a forming tool 40,
breather fabrics 42 provided at the periphery of the preform 30 and of the forming tool 40, in contact with the placement surface 38 at the ports 36 of the gas extraction means,
a release film 44 covering the forming tool 40,
a bleeder felt 46 which covers the forming tool 40 and the breather fabrics 42, and
a bag 48 which is attached to the placement surface 38 via sealing means 50 around the periphery of the breather fabrics 42.

After this covering has been fitted, the preform undergoes a polymerization cycle at the end of which the fibres have become embedded in a matrix of resin. As illustrated in FIG. 4, the polymerization cycle comprises a temperature cycle 52, a pressure cycle 54 outside the bag and a vacuum-pulling cycle 56 inside the bag 48.

The temperature cycle 52 comprises a temperature increase, a temperature soak and a cooling phase. According to the procedure illustrated in FIG. 4, the temperature cycle comprises two temperature soaks.

The pressure cycle 54 comprises a pressurizing, a pressure hold and finally, a reduction in pressure down to atmospheric pressure.

The vacuum-pulling cycle 56 is started at the same moment as the temperature and pressure cycles and is maintained until the end of the cooling phase.

As pressurization is markedly more rapid than the increase in temperature, the bag 48 transmits the maximum pressure to the forming tool 40 for most of the temperature-increase time.

As illustrated in FIG. 5A, the forming tool 40 applies compressive load 58 to the first layer and this is then transmitted successively to the layers below. In the event of a defect, as illustrated in FIG. 5A, these compressive loads 58 which are almost normal to the contact surface create inter-layer shear stresses 60, notably between the layers 26, 26' that are separated by the space 28.

When the temperature increases, adhesion between the layers decreases such that, because of the inter-layer shear stresses 60, there is tearing between two successive layers, leading to the formation of wrinkles 62 in the fibres as has been illustrated in FIG. 5B.

Thus, according to the prior art, the bridging type defect when stacking the layers leads to a defect whereby there are undulations in the fibres of the component at the end of the manufacturing process.

The presence of these undulations in the fibres in the composite component has a tendency to reduce the mechanical properties thereof.

SUMMARY

The present invention seeks to remedy the disadvantages of the prior art.

Thus, the invention proposes a method of manufacture that makes it possible to reduce the appearance of undulations in the fibres of a composite component that has a re-entrant angle even if the stacking of layers in order to obtain the preform leads inevitably to the generation of bridging between two layers at the re-entrant angle.

To this end, one subject of the invention is a method for producing, in a composite material, a component that has a re-entrant angle, the said method comprising the steps consisting in stacking layers of fibres which have been pre-impregnated with a resin so as to obtain a preform and in placing the said preform in a tooling fixture in order to subject it to a polymerization cycle comprising a temperature cycle with a temperature-increase phase and at least on soak at which the temperature is maintained, and a pressure cycle on the outside of the tooling fixture with a pressure-increase phase and a pressure-hold phase, the layers of pre-impregnated fibres being able to slip against one another when the temperature of the temperature cycle is equal to or higher than a threshold temperature Tf dependent on the resin, characterized in that the temperature-increase phase of the temperature cycle comprises a soak at a temperature higher than or equal to the threshold temperature Tf, the said soak beginning before the end of the pressure-increase phase.

BRIEF DESCRIPTION OF DRAWINGS

Other features and advantages will become evident from the following description of the invention, which description is given solely by way of example with reference to the attached drawings in which.

DETAILED DESCRIPTION

Figure 7A:
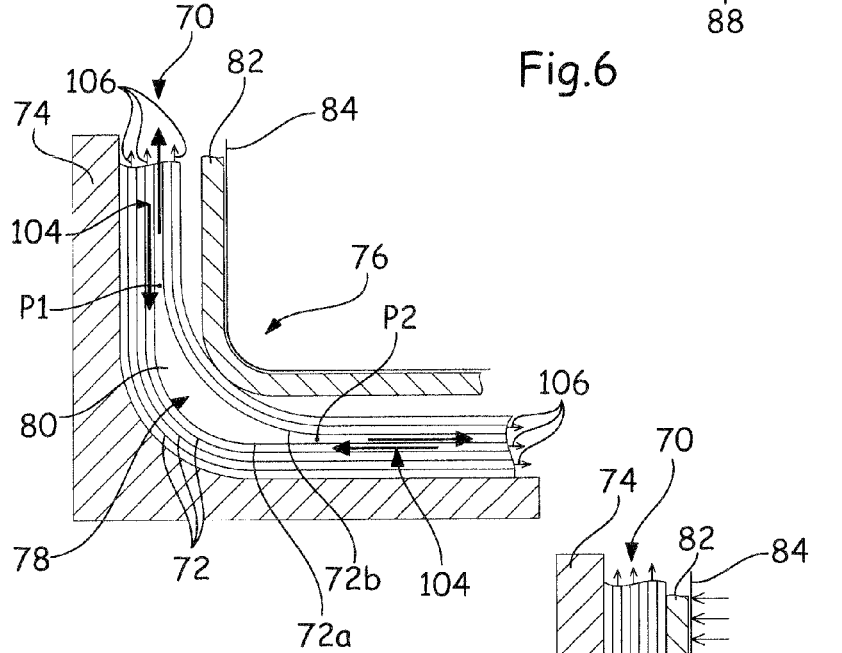
FIG. 7A is a section through a preform illustrating a defect of the bridging type during a temperature-increase phase during a polymerization phase according to the invention.
Figure 7B:
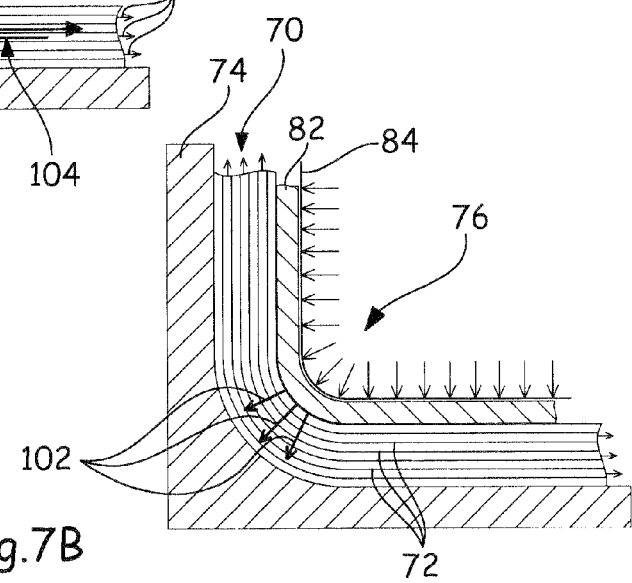
FIG. 7B is a section through the preform illustrated in FIG. 7A illustrating the correction of the bridging defect during the polymerization phase.

FIG. 7A depicts, at 70 a preform of pre-impregnated fibres which is obtained by stacking layers 72 of fibres.

The term layer can mean a ply of fibres or a strip comprising several plies. In the remainder of the description, the longest dimension of the layers corresponds to the longitudinal direction.

The stack of layers of fibres 72 is performed on a mould 74 which may also be used during the polymerization phase.

This preform 70 comprises at least one re-entrant angle 76, the surface of the preform 70 which is not in contact with the mould 74 having a shape that is concave in a plane of section perpendicular to the longitudinal direction.

Given the « tack » of the layers of pre-impregnated fibres, a defect 78 of the bridging type almost always occurs when stacking the layers 72. This defect 78 of the bridging type comprises a space 80 between successive layers 72a and 72b at the re-entrant angle 76. Thus the layers 72a and 72b are no longer in contact with one another between a first point P1 situated on one side of the vertex of the re-entrant angle and a point P2 situated on the other side of the re-entrant angle. Between these points P1 and P2, the arc length of the layer 72a is greater than the length of the arc of the layer 72b.

Figure 1:
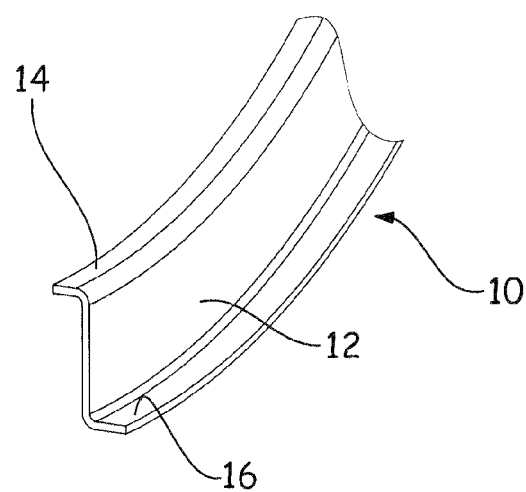
FIG. 1 is a perspective view of a portion of an aircraft fuselage frame.
Figure 2:
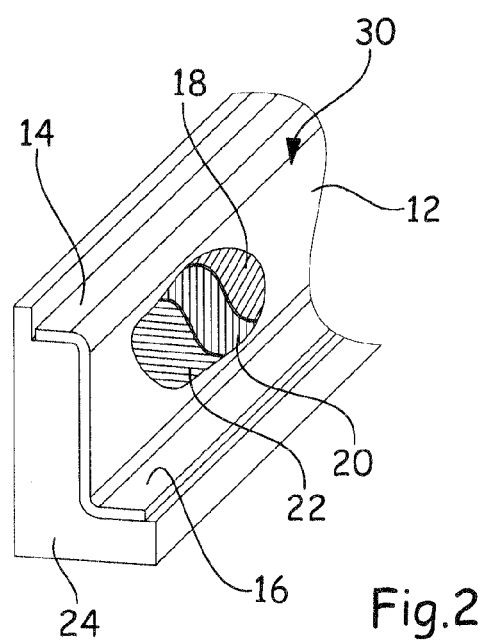
FIG. 2 is a perspective view of a stack of layers of fibres on a rectilinear deformable mandrel with cutaway so as to illustrate the orientation of the fibres in the stacked layers.
Figure 3:
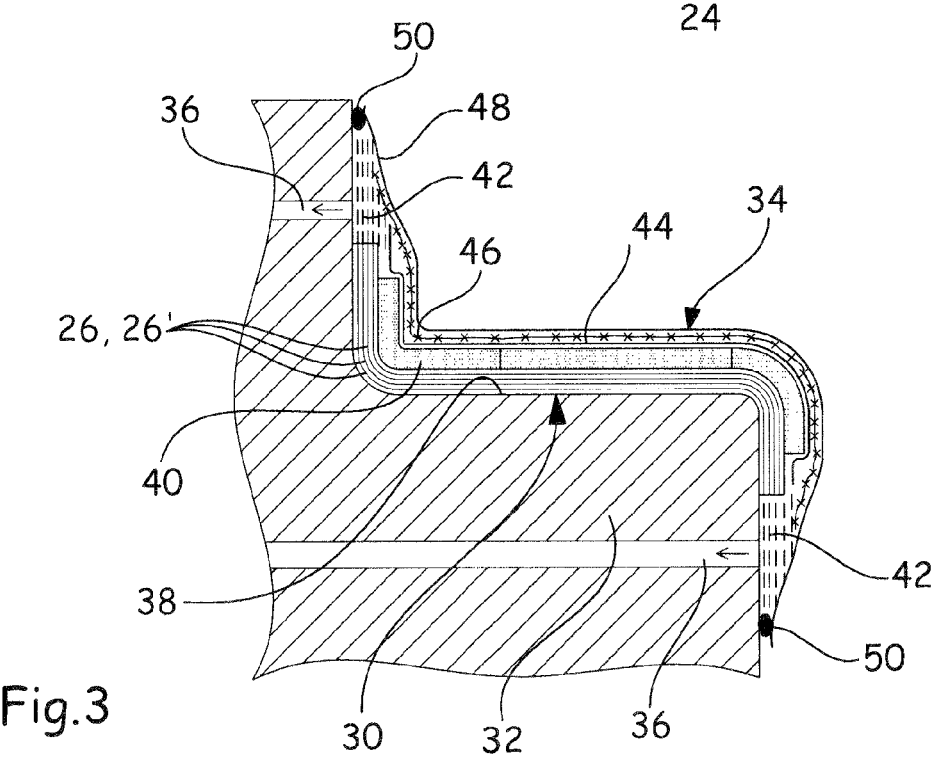
FIG. 3 is a cross section through a tooling fixture in which a preform produced by stacking layers of fibres has been positioned.
Figure 4:
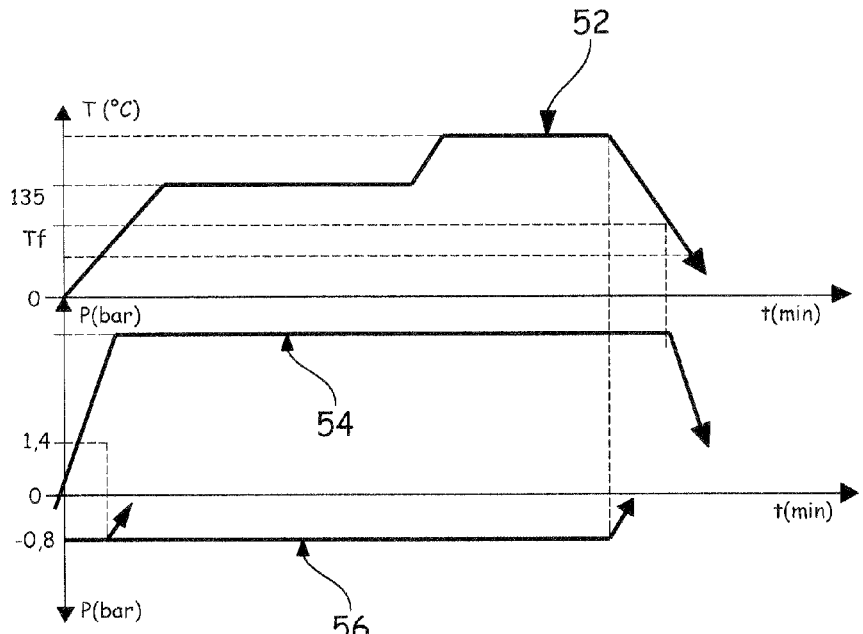
FIG. 4 is a schematic depiction of temperature, pressure and vacuum-pulling cycles during a polymerization cycle according to the prior art.
Figure 5A:
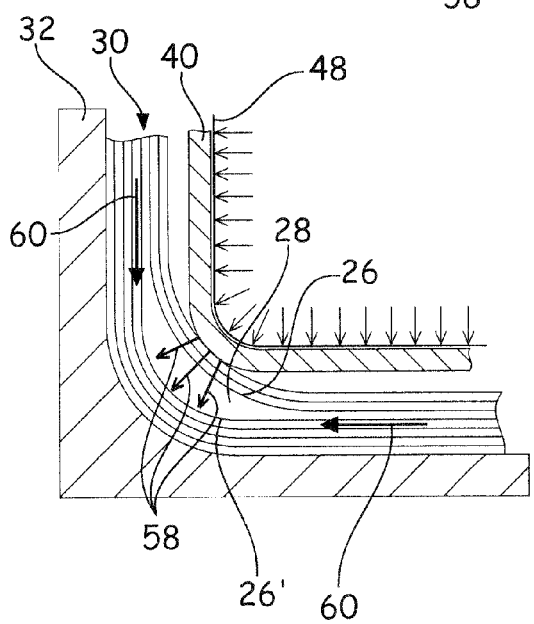
FIG. 5A is a section through a preform illustrating a defect of the bridging type and the loads generated by the exterior pressure during a temperature-increase phase in a polymerization cycle according to the prior art.
Figure 5B:
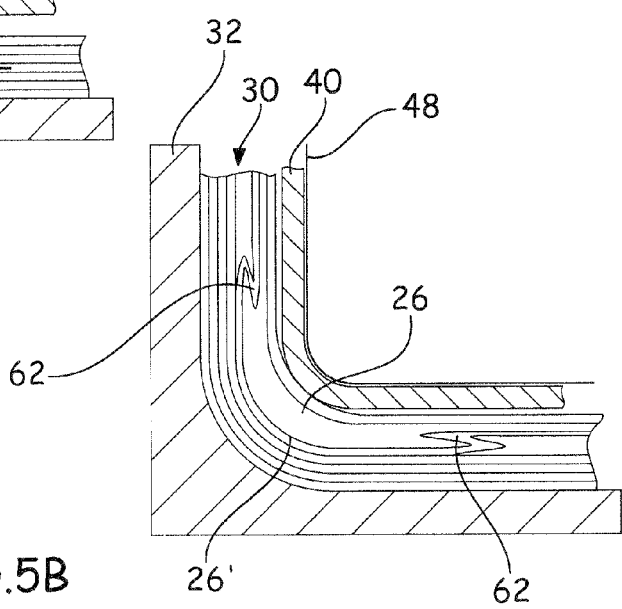
FIG. 5B is a section through the preform illustrated in FIG. 5A, illustrating the formation of wrinkles during a polymerization cycle according to the prior art.

During the polymerization cycle, the preform 70 is placed in a tooling fixture comprising a mould 74 and a covering. This tooling fixture may be identical to that of the prior art. Thus, to make the depiction simpler, only the forming tool 82 and the bag 84 of the covering have been depicted in FIGS. 5A and 5B. As in the prior art, when the pressure on the outside of the tooling fixture increases, the bag 84 applies a compressive load which tends to press the forming tool 82 firmly against the preform 70.

For preference, the tooling fixture comprises a forming tool 82 positioned between the preform and the bag at the re-entrant angle to ensure that the re-entrant angle is formed correctly. Thus, in general, if the bag 84 is not associated with a forming tool 82, the tooling fixture is unable to achieve the geometry of the re-entrant angle.

Figure 6:
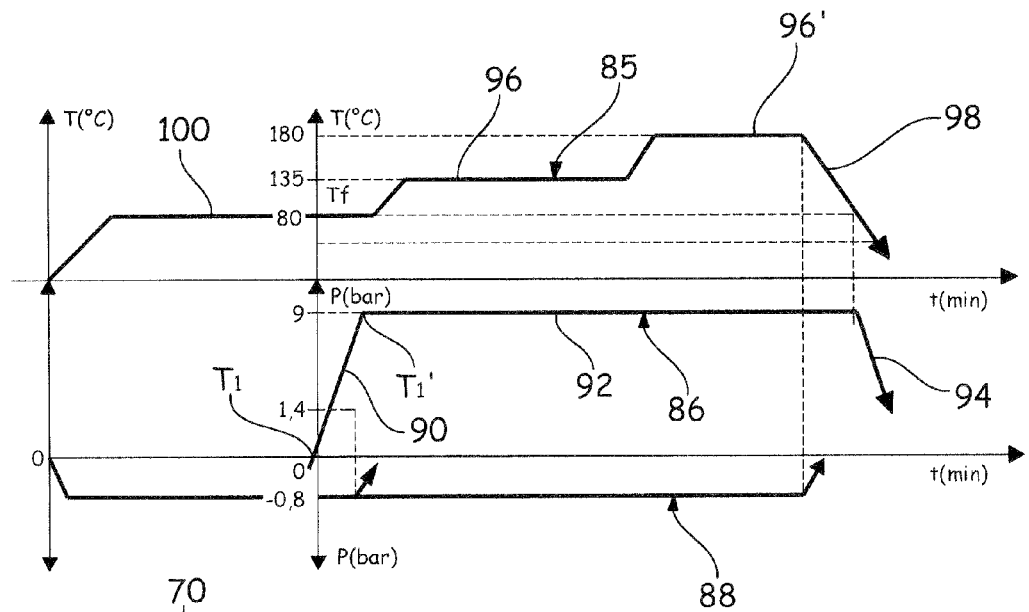
FIG. 6 is a schematic depiction of temperature, pressure and vacuum-pulling cycles during a polymerization cycle according to the invention.

As illustrated in FIG. 6, the polymerization cycle comprises a temperature cycle 85 and a pressure cycle.

For preference, the pressure cycle comprises a pressure cycle 86 on the outside of the tooling fixture and a vacuum-pulling cycle 88 on the preform 70 on the inside of the tooling fixture in the zone delimited by the mould 74 and the bag 84.

The pressure cycle 86 on the outside of the tooling fixture begins at the instant T1 and comprises a pressure-increase phase 90, a pressure-hold phase 92 and a return phase, in which the pressure returns to atmospheric pressure, 94, The increase in pressure is very rapid such that the instant T1' that corresponds to the start of the pressure-hold phase 92 is very close to T1.

The temperature cycle 85 comprises a temperature-increase phase, one or more temperature soaks 96 and a cooling phase 98.

The end of the pressure hold phase 92 begins when the resin has solidified and occurs during the cooling phase 98. Thus, the end of the pressure-hold phase 92 comes after the start of the cooling phase.

By way of example, during the pressure-hold phase 92, the pressure on the outside of the tooling fixture is of the order of 9 bar.

According to the illustrated example, the temperature cycle 85 comprises two soaks 96 and 96', one at 135° C. and the other at 180° C. As an indication of an order of magnitude, the two soaks have a duration of the order of 120 to 180 min.

Of course, the invention is not restricted to this number of soaks, or to these soak durations, or to these pressure and temperature values. All these features will be adjusted by a person skilled in the art notably according to the rheology of the resin.

During the temperature increase, when the temperature is equal to or higher than a threshold temperature Tf dependent on the resin, the layers of pre-impregnated fibres can slide against one another without wrinkling.

This threshold temperature Tf is determined by testing. It varies according to the resin, to the fibres, to the types of weaving in the layer, etc.

As an indication of an order of magnitude, the threshold temperature Tf varies between 50 and 65° C.

According to the invention, the preform is held at a soak temperature higher than or equal to the threshold temperature Tf before the end of the pressure-increase phase 90. Advantageously, the soak temperature is lower than the temperature at which polymerization begins, which corresponds approximately to the temperature of the first temperature soak 96 of the temperature cycle. For preference, the preform is held at the soak temperature before the start of the pressure cycle.

Thus, according to the invention, the temperature-increase phase comprises a soak 100 at a temperature higher than or equal to the threshold temperature Tf but preferably lower than the temperature of the start of polymerization, the said soak 100 beginning before the end of the pressure-increase phase 90 and preferably before the start of the pressure cycle 86.

The soak 100 is at a temperature of the order of 80° C.

The duration of the soak 100 prior to the start of the pressure cycle needs to be long enough to obtain a uniform temperature throughout the preform that is higher than or equal to the threshold temperature Tf. By way of example, the duration of the soak 100 prior to the start of the pressure cycle 86 is greater than or equal to 30 min.

Advantageously, the vacuum-pulling cycle 88 begins before the start of the pressure cycle 86 and preferably at the same time as the temperature cycle 85. This feature allows the fibres to be subjected to tensile loadings before the layers are compressed in as much as the ends of the fibres are sucked down at the periphery of the preform, and also allows any air included within the layers of the preform to be extracted.

FIG. 7A depicts the preform 70 during the soak 100 prior to the start of the pressure cycle 86. In this case, the bag 84 and the forming tool 82 are applying only a very light load to the preform 70 because of the vacuum that has been pulled. These loads are markedly lower than the compression loads 104 applied by the bag 84 and the forming tool 82 during the pressure cycle 86, therefore these loads have not been depicted.

During this soak 100, the conditions necessary for the layers 72 to be able to slip over one another as illustrated by the arrows 104 are created. The pulling of the vacuum allows tensile loads 106 to be applied to the fibres of the layers.

When the pressure cycle 86 is begun, the bag 84 and the forming tool 82 apply compression loads 102 to the preform. Because the resin is sufficiently fluid, the layers can slip relative to one another, which prevents the wrinkling that is likely to occur in the prior art. At the end of polymerization, the layers are all pressed firmly together without defect, namely without any spaces and without any wrinkles at the re-entrant angles.

According to the invention, the bridging defects no longer give rise to a new defect during the polymerization cycle but rather become an advantage in as much as the fibres experience light tension as a result of the slippage that occurs between the layers. By virtue of the defects of the bridging type, the fibres are also all stretched out in the preform and any potential local excesses in the lengths of the fibres are eliminated.

The invention claimed is:

1. A method for producing, in a composite material, a component that has a re-entrant angle, the said method comprising:

stacking, in a mold of a tooling fixture, layers of fibres which have been pre-impregnated with a resin so as to obtain a preform having said re-entrant angle, the stack of layers of pre-impregnated fibres comprising a defect of the bridging type at the re-entrant angle;

subjecting the preform disposed in the tooling fixture to a polymerization cycle comprising a temperature cycle including a temperature-increase phase and a first soak at which temperature is maintained, a second soak at which temperature is maintained and a third soak at which temperature is maintained, and a pressure cycle which includes subjecting the preform to a pressure at a location outside of the tooling fixture, the pressure cycle including a pressure-increase phase and a pressure-hold phase;

determining a threshold temperature Tf of the resin wherein, during the temperature-increase phase, when the temperature is equal to or higher than said threshold temperature Tf, the layers of fibres are able to slip against one another without wrinkling;

subjecting the preform to a vacuum-pulling cycle in which a vacuum is pulled on the inside of the tooling fixture, the vacuum-pulling cycle beginning before the start of the pressure cycle and at the same time as the start of the temperature cycle so that the fibres are subjected to tensile loadings before the layers of pre-impregnated fibres are compressed, the defect of the bridging type allowing the fibres in the preform to be stretched out; and causing, during the polymerization cycle, the layers of pre-impregnated fibres to slip against one another when the temperature of the temperature cycle is equal to or higher than the threshold temperature Tf which is dependent on the resin, characterized in that at least one of said first soak, said second soak and said third soak is at a temperature higher than or equal to the threshold temperature Tf, and at least one of said first soak, said second soak and said third soak beginning after the start of the pressure-increase phase, characterized in that the temperature cycle includes subjecting the preform to a temperature decrease phase after said first soak, said second soak and said third soak to bring the temperature to a lower temperature than the temperature of the start of polymerization and ending the pressure-hold phase after start of said temperature decrease phase, and characterized in that the method comprises using a forming tool interposed between the preform and a bag at the re-entrant angle.

2. The method according to claim 1, characterized in that said first soak begins before the end of the pressure-increase phase and said second soak begins after the start of the pressure-increase phase.

3. The method according to claim 2, characterized in that the duration of the first soak prior to the start of the pressure cycle is long enough to obtain a uniform temperature throughout the preform that is higher than or equal to the threshold temperature Tf.

4. The method according to claim 3, characterized in that the duration of the first soak prior to the start of the pressure cycle is greater than or equal to 30 min.

5. The method according to claim 1, characterized in that both the second soak and the third soak are performed during the pressure-hold phase.

6. The method according to claim 5, characterized in that both the second soak and the third soak are performed during the pressure-hold phase.

7. The method according to claim 1, characterized in that said first soak is at a temperature higher than or equal to the threshold temperature Tf.

8. The method according to claim 1, characterized in that said second soak is at a temperature higher than or equal to the threshold temperature Tf.

9. The method according to claim 1, characterized in that said third soak is at a temperature higher than or equal to the threshold temperature Tf.

* * * * *